(12) United States Patent
Zevetchin et al.

(10) Patent No.: US 11,972,427 B2
(45) Date of Patent: Apr. 30, 2024

(54) SYSTEM FOR DETERRING UNAUTHORIZED ACCESS TO AN ACCOUNT ASSOCIATED WITH AN ONLINE ORDERING PLATFORM

(71) Applicant: Subway IP LLC, Milford, CT (US)

(72) Inventors: Camden Zevetchin, Trumbull, CT (US); John Arnold, Milford, CT (US)

(73) Assignee: Subway IP LLC, Milford, CT (US)

( * ) Notice: Subject to any disclaimer, the term of this patent is extended or adjusted under 35 U.S.C. 154(b) by 0 days.

(21) Appl. No.: 17/386,049

(22) Filed: Jul. 27, 2021

(65) Prior Publication Data
US 2023/0032497 A1    Feb. 2, 2023

(51) Int. Cl.
*G06Q 20/40*    (2012.01)

(52) U.S. Cl.
CPC ..... *G06Q 20/4014* (2013.01); *G06Q 20/4016* (2013.01); *G06Q 20/405* (2013.01); *G06Q 20/407* (2013.01)

(58) Field of Classification Search
None
See application file for complete search history.

(56) References Cited

U.S. PATENT DOCUMENTS

| | | | | |
|---|---|---|---|---|
| 2012/0290390 A1* | 11/2012 | Harman | ............ | G06Q 20/3224 705/26.1 |
| 2017/0289168 A1* | 10/2017 | Bar | ...................... | H04L 63/1408 |
| 2019/0190934 A1* | 6/2019 | Peppe | ................. | H04L 63/1441 |
| 2020/0236099 A1* | 7/2020 | Mitchell | ............... | G06F 21/316 |
| 2022/0148000 A1* | 5/2022 | Mimassi | ............... | G16H 20/60 |

\* cited by examiner

*Primary Examiner* — Bruce I Ebersman
*Assistant Examiner* — Matthew Cobb
(74) *Attorney, Agent, or Firm* — Welsh IP Law LLC (57) ABSTRACT

A system and a method for deterring unauthorized access to an account. The method includes the steps of receiving a user login request from one of a plurality of account holder computers, then identifying a username associated with the received user login request, a time associated with the received user login request, and an internet protocol (IP) address associated with the received user login request. The method and system determine a number of prior login requests received from the identified IP address during a duration of time $T_R$ prior to the identified time. Each of the received login requests has a unique username that is different than the identified username. The method includes the step of disabling access to the account associated with the identified username when the determined number of received login requests is above a request threshold B.

19 Claims, 9 Drawing Sheets

SYSTEM FOR DETERRING UNAUTHORIZED ACCESS TO AN ACCOUNT ASSOCIATED WITH AN ONLINE ORDERING PLATFORM

TECHNICAL FIELD

The present disclosure generally relates to an application for receiving orders any payment for products. More specifically, the present invention relates to a system and method for deterring unauthorized access to an account associated with an online ordering platform for a restaurant.

BACKGROUND

The use of web-based applications allowing customers to place orders and make payment for products are becoming increasingly common place. This is particularly so in the food and beverage industry and the quick service restaurant segment. A company may develop and offer to its customers a proprietary software application that is available for use on a mobile device, such as an Apple or Android based phone, or through a web browser. Among other things, the software application enables the customers to place an order and make payment at a restaurant associated with the company for delivery, pick-up, or eat-in. The company may encourage use of its application, and therefore demand for its products, by integrating a loyalty program with the application wherein a user can earn loyalty points or store credit based on its level of use of the application.

To use the application, the customer may be required to open a user account. The user account is accessible by a unique username assigned to or selected by the user of the application and a password. The user can access her account through the application by entering the username and password into the application. The application may then remain accessible to the user for a duration of time without a subsequent authentication event. This duration of time may be selected by the owner of the application so as to minimize the number of credential requests required to use the application, thereby encouraging adoption and continued use by the customer. This interest, however, must be balanced with maintaining secure control over the application.

Maintaining secure control over the application is important because such applications may include personal information of the user. In addition, such applications may include a payment function that is accessible through the application. For example, the application may include functionality through the app that enables the customer to use one or more third party payment systems, such as PayPal or Apple Pay, and credit cards, such as Visa or American Express. The use of these third-party payment systems that are integrated into the application, may or may not, include an authentication function separate from the login credentials required by the application. In addition, the application may enable a customer to load value from gift cards or other promotion products onto the account and to pay for products using this value. In addition, the applications may enable the customer to pay for products using loyalty points accumulated through the use of the application.

A disadvantage of such applications is that they are susceptible to fraud perpetrated by unauthorized users. For example, in one fraud technique an unauthorized user will acquire a plurality of stolen credentials through, for example, an acquisition made on the dark web. The unauthorized user will then proceed to serially access each stolen credential to determine any value, for example in the form of loyalty points and gift card value. After identifying value on an account, the unauthorized user will purchase products from a restaurant using the points or gift card value. The third-party payments may be protected via another layer of authentication protection and therefore may not be accessible to the unauthorized users. While the value of the potential theft may be relatively small, the unauthorized access may cause significant problems, particularly as the method of fraud becomes more widespread. For example, the fraud causes problems for the consumer and the relationship with the company. The fraud may also create problems for franchise restaurants associated with the company that may be responsible for the loss. It is known to inhibit such serial account takeovers by increasing the number of credential authentication events. This has the disadvantage of inhibiting customers from consistently using the application.

Thus, there exists a need in the art for an improved system and method for deterring serial unauthorized access to accounts associated with an online ordering platform for a restaurant.

SUMMARY OF THE INVENTION

The needs set forth herein as well as further and other needs and advantages are addressed by the present teachings, which illustrate solutions and advantages described below.

It is an objective of the present teachings to remedy the above drawbacks and issues associated with a system for deterring unauthorized access to an account associated with an online ordering platform for a restaurant. This system includes a server hosting an online ordering application that enables authorized users to place and pay for orders at a restaurant. The system further includes a plurality of account holder computers and a plurality of connections over the Internet, one between each account holder computer and the server. The system further includes a data store accessible by the server. The data store maintains an account database, the account database having a plurality of records each having a username associated therewith. The system further includes an interface on the server for receiving a user login request from one of the plurality of account holder computers. The system further includes an identification module on the server for identifying a username associated with the received user login request, a time associated with the received user login request, and an internet protocol (IP) address associated with the received user login request. The system further includes a determination module on the server for determining a number of prior login requests received from the identified IP address during a duration of time $T_R$ prior to the identified time, each of the received login requests having a unique username being different than identified username. The system further includes an account disabling module on the server for disabling access to the account associated with the identified username when the determined number of received login requests is above a request threshold B.

In yet a further embodiment of the present invention the account disabling module disables access to the account for a duration of time $T_B$ when the determined number of received login requests is above the request threshold B.

In yet a further embodiment of the present invention, the system includes a review module on the server for reviewing a received login request to determine whether the account is disabled. The system prevents access to the account when the account is disabled.

In yet a further embodiment of the present invention $T_R$ is five minutes or less.

In yet a further embodiment of the present invention the request threshold B is three or less.

In yet a further embodiment of the present invention the request threshold B is two.

In yet a further embodiment of the present invention $T_R$ is one minute or less.

In yet a further embodiment of the present invention the identification module further identifies a risk score associated with the received login request.

In yet a further embodiment of the present invention, the determination module determines whether the risk score associated with the received request is within an acceptable risk score range.

In yet a further embodiment of the present invention, the disabling module disables access to the account associated with the identified username when the risk score is not within the acceptable risk score range.

The present invention resides in yet another aspect in a system for deterring unauthorized access to an account. The system includes a server hosting an application that enables authorized users to place and pay for goods. There are a plurality of account holder computers capable of accessing the server via a connection over the Internet. The system includes an account database accessible by the server. The account database has a plurality of records each having a username associated therewith. The system further includes an interface on the server for receiving a user login request from one of the plurality of account holder computers. The system further includes an identification module on the server for identifying a username associated with the received user login request, a time associated with the received user login request, an internet protocol (IP) address associated with the received user login request, and a risk score associated with the received login request. The system further includes a determination module on the server for determining a number of previous login requests received from the identified IP address during a duration of time $T_R$ before the identified time, each of the received login requests having a unique username being different than identified username, the determination module further determines whether the risk score associated with the received request is within an acceptable risk score range. The system further includes an account disabling module on the server for disabling access to the account associated with the identified username when one or more of: the determined number of received login requests is above a request threshold B and the risk score is not within the acceptable risk score range.

In yet further embodiments of the present invention, the identified risk score is provided by a third party based on one or more attributes associated with the account holder computer.

In yet a further embodiment of the present invention, the account disabling module disables access to the account for a duration of time $T_B$ when the determined number of received login requests is above the request threshold B.

In yet a further embodiment of the present invention, the system includes a review module on the server for reviewing a received login request to determine whether the account is disabled. The system prevents access to the account when the account is disabled.

In yet a further embodiment of the present invention, $T_R$ is five minutes or less.

In yet a further embodiment of the present invention, the request threshold B is three or less.

The present invention resides in yet another aspect in a method for deterring unauthorized access to an account associated with an online ordering application operating on a server from an account holder computer. The method includes the step of on the application server, receiving a user login request from one of a plurality of account holder computers. The method further includes the step of identifying a username associated with the received user login request, a time associated with the received user login request, and an internet protocol (IP) address associated with the received user login request. The method further includes the step of determining a number of prior login requests received from the identified IP address during a duration of time $T_R$ prior to the identified time, each of the received login requests having a unique username being different than identified username. The method further includes the step of disabling access to the account associated with the identified username when the determined number of received login requests is above a request threshold B.

In yet a further embodiment of the present invention, the account is disabled for a duration of time $T_B$ when the determined number of received login requests is above the request threshold B.

In yet a further embodiment of the present invention, the method includes the step of reviewing a received login request to determine whether the account is disabled. The method further includes the step of preventing access to the account when the account is disabled.

In yet a further embodiment of the present invention, $T_R$ is five minutes or less.

In yet a further embodiment of the present invention, the request threshold B is three or less.

In yet a further embodiment of the present invention, the method includes the step of identifying a risk score associated with the received login request.

In yet a further embodiment of the present invention, the method includes the step of determining whether the risk score associated with the received request is within an acceptable risk score range.

In yet a further embodiment of the present invention, the method includes the step of disabling access to the account associated with the identified username when the risk score is not within the acceptable risk score range.

DETAILED DESCRIPTION

The present teachings are described more fully hereinafter with reference to the accompanying drawings. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first', 'second,' etc. for different features/components of the present disclosure are only intended to distinguish the features/components from other similar features/components and not to impart any order or hierarchy to the features/components.

In the present teachings, a person who maintains an account is referred to as an account holder. The present teachings may be facilitated by a system, which may be cloud- or Internet-based. The system according to the present teachings contains functionality of a virtual online ordering and payment system. The system according to the present deters invention unauthorized serial account access.

The account holder may use an electronic device to communicate with the platform and use the functions of the platform. An electronic device according to the present teaching may include at least one or more of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device.

The platform may include hardware, such as a computer or a server, or components thereof. The platform may provide an environment in which a piece of software is executed, such as a web page, an application, or a remote desktop. The platform may include a plurality of computers in communication via one or more networks. The system may include a module for receiving a login request to an account maintained on the system.

In one embodiment of the present invention, the system is a web-based application for a business. The business may include, but is not limited to, a quick service restaurant business. For example, in one embodiment, the system is a web-based application offer under the brand name SUBWAY MYWAY REWARDS® to customers of SUBWAY restaurants. Subway is a quick service restaurant franchise that sells sandwiches, salads and beverages. There are currently more than 20,000 SUBWAY restaurants in the United States. Traditionally, a customer will purchase a products at a SUBWAY restaurant by ordering at a sandwich counter. In some stores, the customer may place an order by telephone. In some stores, a drive-thru window is available for ordering.

Traditionally, SUBWAY restaurants offered a customer loyalty program wherein a customer receives a loyalty benefit for each purchase at the business. This may have taken the form of a stamp or punch in a loyalty card maintained by the customer. After acquiring a threshold number of loyalty stamps, the customer was entitled to a free or discount product at a participating restaurant in the SUBWAY group.

In recent years, SUBWAY restaurants has developed and adopted a web-based application that provides an account holder with the opportunity to order food from a location and earn loyalty points that are redeemable for food products. The adoption and widespread use of such web-based applications is greatly aided by the broad use of smart phones and the prevalence of high-speed Internet that is available through public and private networks. Such web-based applications are known in the industry and have been adopted by different businesses in the restaurant sector. Accordingly, the specifics of such systems, including the SUBWAY MYWAY REWARDS application, are not described in detail herein. Certain features of the system are discussed for the broader purpose of illustrating the present invention.

In reference to FIGS. 5A-5D, screenshots from the SUBWAY MYWAY application are shown wherein the application is running on Apple's iOS on a smart phone. Through the application, the account holder connects to a central platform via a network such as the Internet. In reference to FIG. 5A, a login screen is provided 510. An account holder can login to her account on the system by entering a username and a password. In the embodiment disclosed in FIG. 5A, the username is an email associated with the account holder. To the extent a user of the application does not have an account, she can select the Sign Up link on this page and sign up for an account with the MY WAY Rewards platform. To the extent the user enters one or more of an invalid username and an invalid password. the system returns a page 520, shown in FIG. 5B, that states that the email address or password is incorrect and prompts the account holder to please try again. In this manner of requiring login credentials, the system inhibits unauthorized access to a user's account on the system.

Figure 5A:
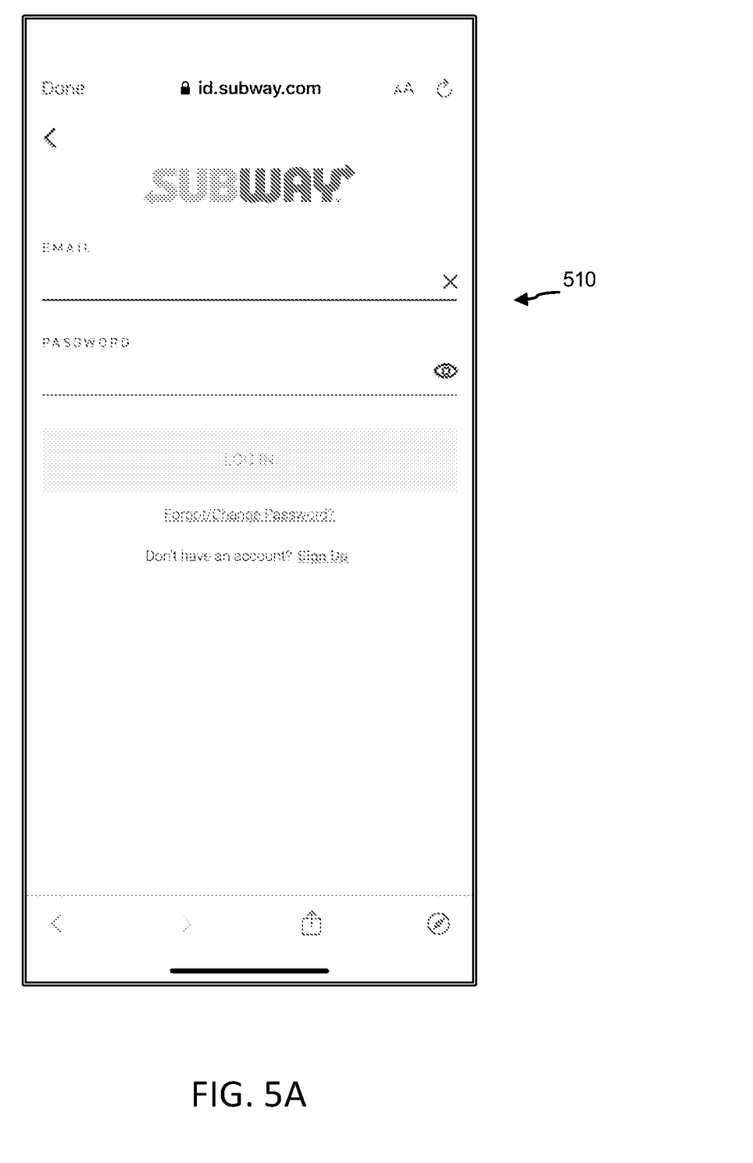
FIG. 5A is screenshot of a graphical user interface in accordance with one embodiment of the present invention.
Figure 5B:
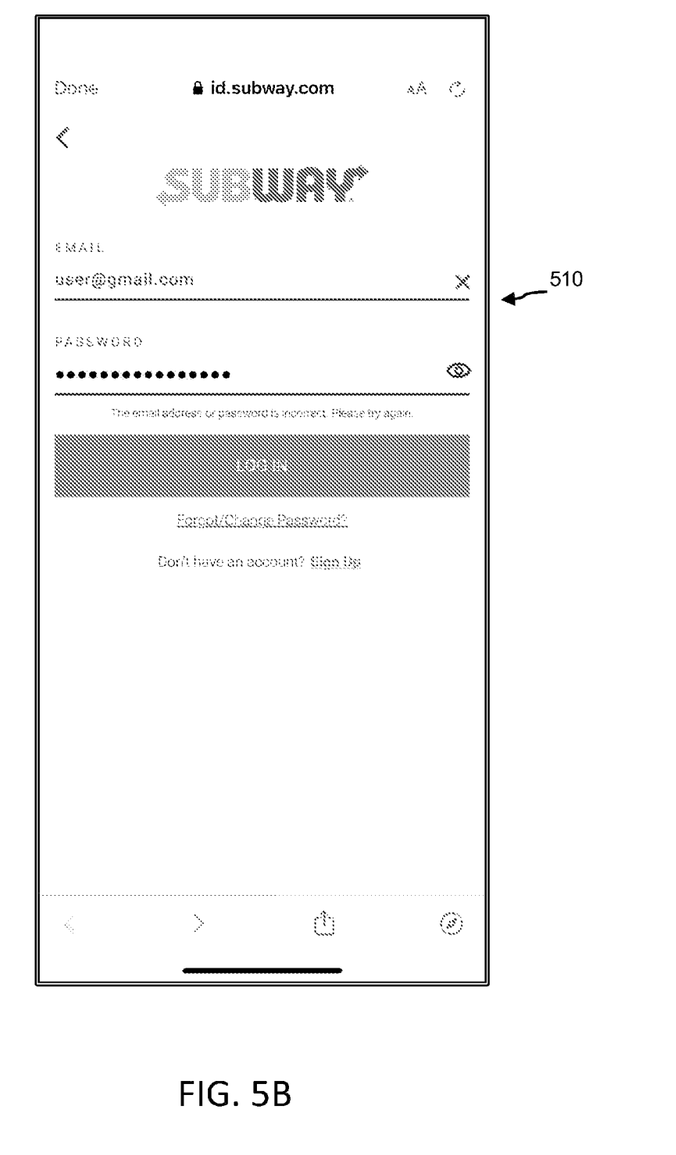
FIG. 5B is screenshot of a graphical user interface in accordance with another embodiment of the present invention.
Figure 5C:
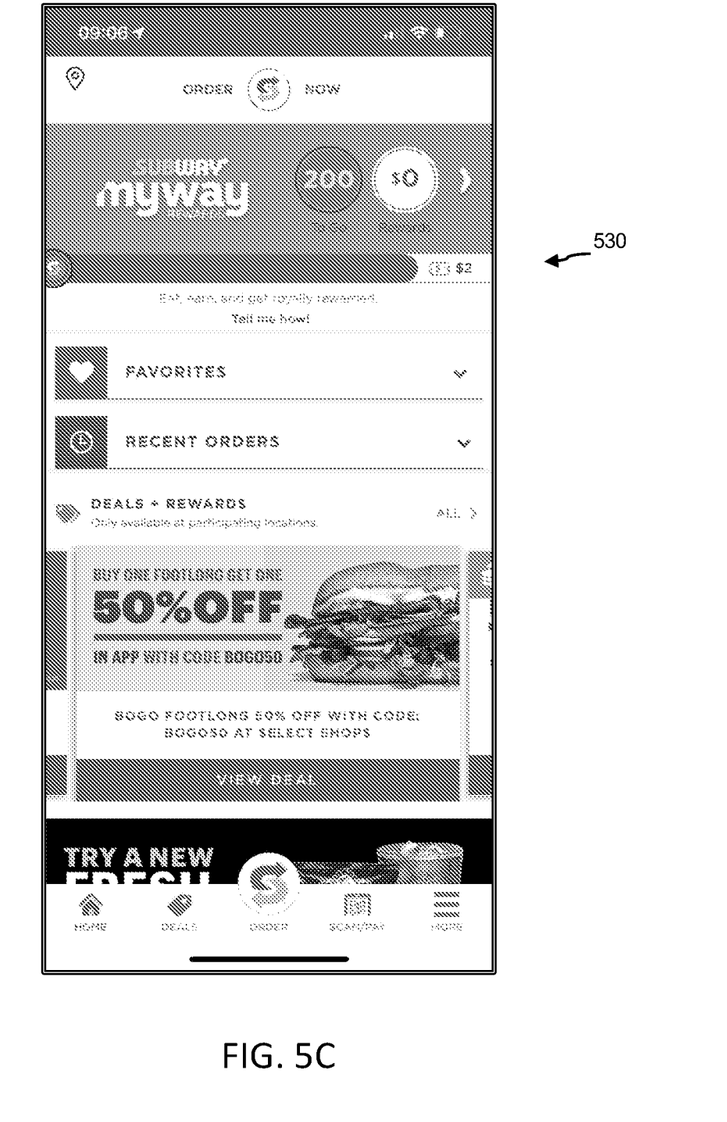
FIG. 5C is screenshot of a graphical user interface in accordance with another embodiment of the present invention.

To the extent the account holder enters the correct login credentials, the application returns a homepage 530 shown in FIG. 5C. From this homepage 530, the user can navigate through the application and access different features therein. The system enables the user to place an order at a SUBWAY restaurant at a location convenient for the customer. For example, the customer may select the Order Now button on the home page and the customer will be brought to an order page wherein the customer can place her order. The customer can choose to pick-up the order in the store, to pick the order up curbside, or to have the order delivered to her location (to the extent this service is available).

Figure 5D:
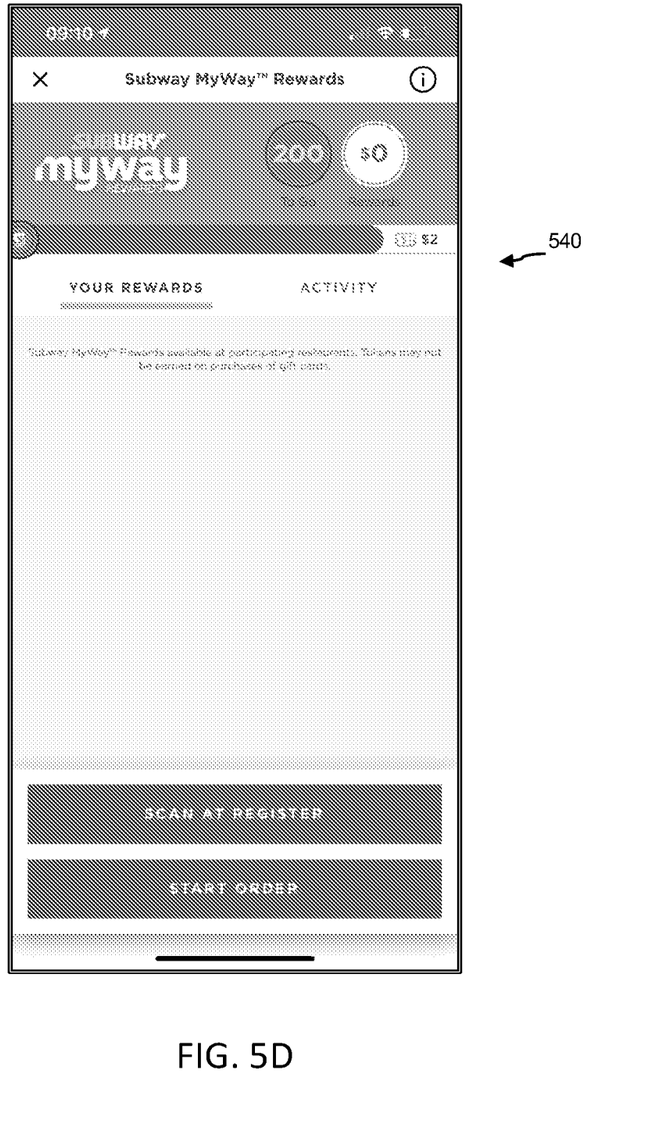
FIG. 5D is screenshot of a graphical user interface in accordance with another embodiment of the present invention.

In reference to FIG. 5D, another page of the application is shown wherein the user can choose to make her order via the application, or alternatively use the application at a SUBWAY restaurant location. In this embodiment, the user may place her order at the counter in the traditional manner and an employee of the business will enter the order in a point-of-sale system and request that the user pay for the order. Through the application, the user can access and display a QR code on her phone that is associated with her account. The user can scan the QR code at the point-of-sale system. This credits the users account with the purchase of the order for the purposes of acquiring loyalty points. In some embodiments, the user can pay for her order using the QR code.

Figure 5E:
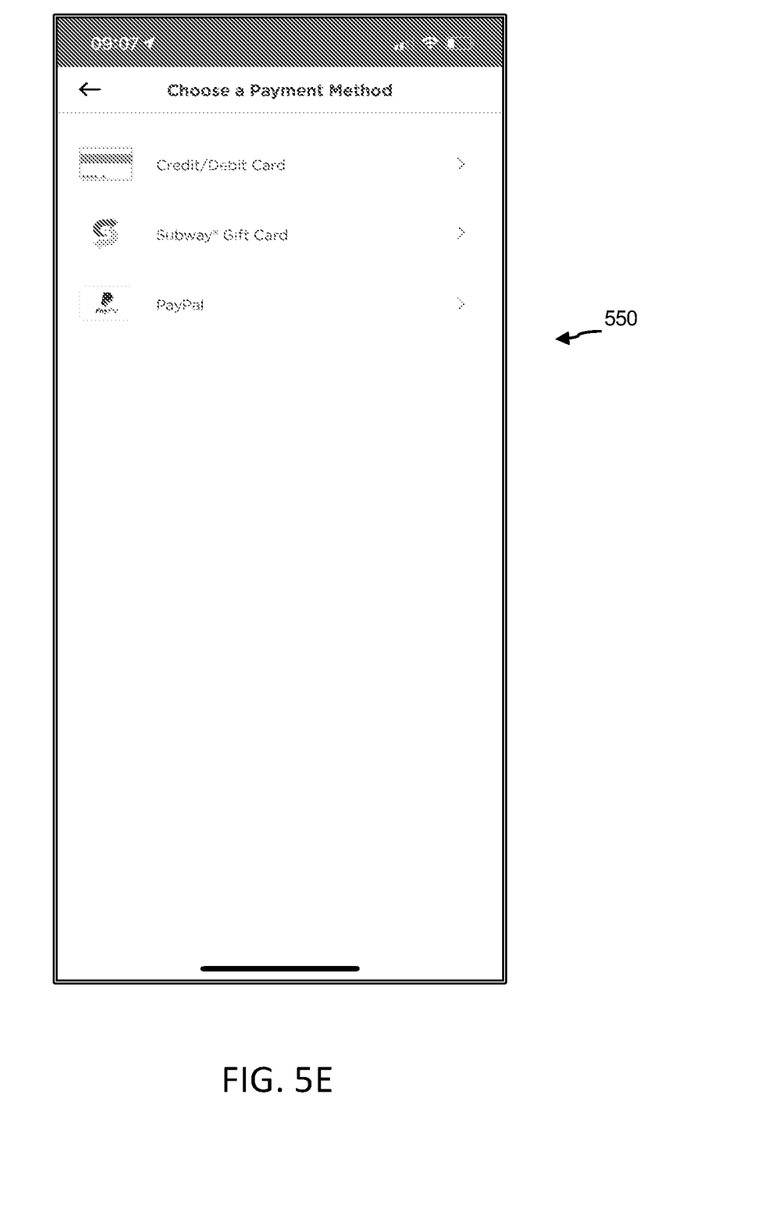
FIG. 5E is screenshot of a graphical user interface in accordance with another embodiment of the present invention.

The SUBWAY MYWAY Rewards application includes a payment module that allows an authorized account holder to pay for her order, whether the order is made remotely through the application or through the store. The account holder can configure a third party payment system to be used with the application. In reference to FIG. 5E, a payment screen is shown in which the account holder can access a credit or debit card, a Subway gift card, or PayPal. The credit card/debit card and PayPal payment options are managed by third party vendors and may require further user authentication independent of the authentication required by the application. The Subway Gift Card, however, may not require further authentication to redeem dollar value. Through the application, at SUBWAY stores, or through third-party venues, the user can purchase a SUBWAY gift card. The cards are available in custom and preset denominations of US dollars. If a physical card is purchased, its value can be loaded onto an account using a code. The user can pay for her order via the app by using the gift card value on the app.

In addition to the payment methods disclosed above, the account holder can earn rewards shown in dollar value by purchasing products from SUBWAY restaurants. The rewards accumulate on the account and may be redeemed by the user to purchase products.

The MYWAY REWARDS application, and other similar applications, are a significant driver in generating and maintaining business at quick service restaurants in today's economy. The consuming public expects to have on-demand access and convenience to food service products. These applications can provide that and are an important driver of revenue. In addition, the loyalty aspect of the applications further incentivizes customers to use the application. This, in combination with the order feature, has contributed to broad acceptance in the market.

Ensuring that customers can have access to their user account through the application is of paramount importance because it ensures easy ready access. If the user does not remember their login credentials, he may not use the app. For example, a person ordering lunch from their desk through an app on their smart phone may decide to order from a different restaurant or service if they need to enter their username and credentials each time, they use the app. For at least this reason, it is common for such loyalty-based applications to minimize the number of times the account login credentials are required for authentication.

A disadvantage of these apps is that they are subject to a type of fraud wherein an unauthorized user obtains a plurality of user login credentials from an unauthorized source, such as stolen account credentials from the dark web. The unauthorized user will then proceed to serially access accounts to determine whether there is any value on the account in one or more of redeemable loyalty points, gift card value, and accessible payment channels such as credit card. In some cases, the credit card or PayPal account associated with the account requires a separate authentication, but the unauthorized user may be able to access the gift card value or loyalty value on the card. For example, the unauthorized user may illegally acquire ten credentials and then serially access them to determine whether any of the associated accounts have value. The unauthorized user will then purchase food from a restaurant and pick-it up.

This scheme causes significant problems for a large quick service restaurant in many facets of its business. This is true, even though the amount lost on a transaction is relatively small. First, it is an actual loss that is typically repaid to the account holder. These costs add up in a large operation. Second, there is the public relations element. As a fraud of this type grows, it can threaten a business model and broader brand perception, particularly if a company does not address it. Then there are the problems for restaurant owners. They must address the issue with a customer that learns that loyalty card has been compromised. Finally, there is potential regulatory risks associated with the mismanagement of customer data.

Figure 1:
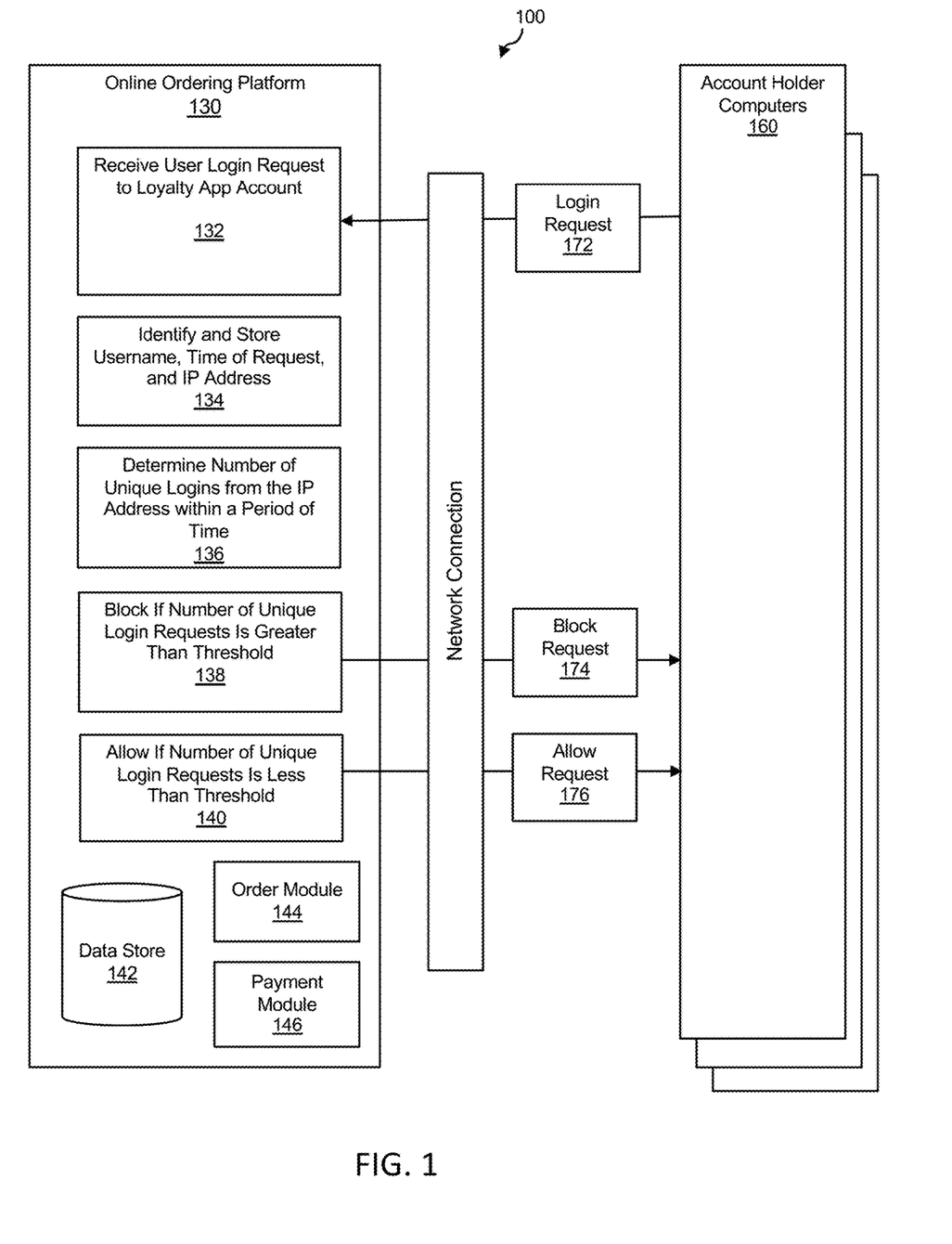
FIG. 1 illustrates a system in accordance with one embodiment of the present invention.

The inventors have discovered a system and method that inhibits this fraud from occurring while not materially limiting general access and use of the application. Referring to FIG. 1, a system 100 according to the present teachings may include an online ordering platform 130 and an account holder computer 160. A user may use the account holder computer 160 to establish a network connection to the platform 130. The computers may communicate with each other via various interfaces. The secure network connection may be accomplished by any number of means to access the functionality provided by the platform 130.

The account holder computer 160 may be an electronic device as defined above. It should be understood by a person or ordinary skill in the art and familiar with this invention that although the term account holder computer is used, the present invention is not limited in this regard. For example, a person without an account on the system may use the account holder computer 160 to access the system and provide login credentials. The platform 130 may be a computer or a server, may be offered as a service by a third-party, and may be provided by secure web pages, an application, or secure remote desktop connection that is executable on account holder computer 160.

The platform may provide a data store 142 (or database (s)) for saving data. The data store 142 may be cloud based or Internet-based. The platform may include one or more modules for communicating with the account holders and receiving messages therefrom.

A user may use the account holder computer 160 to access an account maintained on the platform 130. The account may be protected by secure account credentials, such as a username and a password. In some embodiments of the present invention, the username may be an email associated with the account holder. It should be understood, however, that the present invention is not limited in this regard.

A user may access the online order program executing on the platform through an application provided on the user's phone, i.e., account holder computer 160. Alternatively, the user may access the online ordering platform via a web page rendered on a browser executing on the account holder's computer. The log in page may provide a prompt for the user to enter a username and password associated with her account. The user enters this information into the page using the account holder computer 160 and transmits a login request 172. The login request 173 may include the entered username and password and is transmitted to the online ordering platform via a network connection. The login request 172 is received by a module on the platform 132.

The platform includes an identification module 134. The identifying module 134 may identify one or more of a username associated with a received login request, a time of the login request, and an Internet protocol address (IP address) associated with the login request. In some embodiments of the present invention, the identifying module 134 will identify each of the username associated with the login request, the time of the login request, and the IP address associated with the login request. The time of the login request may be a temporal data point associated with the time the login request is received and is not limited to the hour, minute, and second that the request is received. The IP address is the Internet Protocol address associated with the account holder computer 160. It may be the IP address assigned to the computer 160, or an IP address associated with a wireless network through which the computer 160 is connected to the internet, for example.

The platform 130 may include a module for storing the identified username with the received login request, the identified time with the received user login request, and the identified time associated with the received user login request. This data may store in the data store 142, a short term memory in communication with the platform, or in a different memory.

The platform 130 includes a determination module 136 executing on the platform. The determination module 136 determines a number of unique logins from the identified IP address associated with the login request within a period of time. More specifically, the determination module 136, determines a number of prior login requests received from the identified IP address during a duration of time $T_R$ prior to the identified time each of the received login requests having a unique username being different than identified username.

The platform 130 further includes an account disabling module on the server. The account disabling module 138, 140 disables access to the account associated with the identified username when the determined number of received login request is above a request threshold B. If the number of received requests is greater than the threshold B, the platform blocks the login requests. The platform 130 may transmit a notice indicating that request had been blocked 174 to the account holder computer 160 via the network. This may be in the form a page in the application that says the email address or password is incorrect, please try again. In other embodiments of the present invention, the notice 174 may indicate that the request has been actively blocked.

To the extent the number of received login requests is at or below a request threshold B, the platform allows the request 176 and the user can access her account on the platform 130 through the account holder computer 160.

In this manner, the system 100 in accordance with the present invention block serial requests to access different login requests wherein the requests are emanating from the same IP address and within a period of time. The inventors have discovered that the system 100 greatly deters this type of serial account fraud because it prevents serial unauthorized access to multiple accounts.

In one embodiment of the system 100, the account disabling module disables access to the account for a duration of time $T_B$ when the determined number of received login requests is above the request threshold B. In some embodiments of the present invention $T_B$ is 24 hours. In yet other embodiments of the present invention, $T_B$ is one hour or less. In yet other embodiments of the present invention $T_B$ is between five minutes and thirty minutes. In yet a further embodiment of the invention, $T_B$ is fifteen minutes. The inventors have discovered that using a $T_B$ less than an hour, and preferably fifteen minutes, it is possible t0 inhibit serial fraud of the type discussed above, while also ensuring that the account holder retains access to her account when she attempts an authorized use. In this manner, the account does not require a subsequent login event from the authorized account holder after it is blocked. The account will be accessible on the authorized user's computer because it because unblocked after the period of time $T_B$ in this manner, the present invention inhibits fraud while ensuring access by authorized users.

In some embodiments of the present invention, the server may include a review module. The review module reviews a received login request to determine whether the account to which the username is associated with is disabled. If the system determines that the account is disabled, the system prevents access to the account. This is beneficial, for example, when the time $T_B$ is greater than time $T_R$. As described below, $T_R$ may be less than $T_B$. Therefore, in a certain time window, the determining module will not flag a login request as being improper despite having been recently accessed and blocked. Nevertheless, this module will ensure that login is prevented.

In some embodiments of the present invention, $T_R$ is five minutes or less. In yet further embodiments, the $T_R$ is one minute or less. In this manner, the system inhibits serial unauthorized access from a single IP address while ensuring that authorized users, particularly from a single location, do not trigger the condition. The inventors have discovered that having a $T_R$ at one minute is particularly advantageous for inhibiting unauthorized access, while maintain authorized access.

The request threshold B determines when the system will block a request emanating from a common IP address. In some embodiments of the present invention, the request threshold B is three or less. In this embodiment, the system will block a request from a common IP address if the number of prior requests from the IP address during the time $T_R$ is at least three. In some embodiments of the present invention, the threshold B is two. In one embodiment of the present invention the time $T_R$ is one minute and the threshold B is two. The inventors have discovered that these values are particularly useful for inhibiting fraud. It should be understood, however, to a person of ordinary skill in the art and familiar with this disclosure that these numbers may vary in accordance with a number of factors, such as the type of business, the size of business, and the strategy of the persons attempting the fraud, among others.

Figure 2:
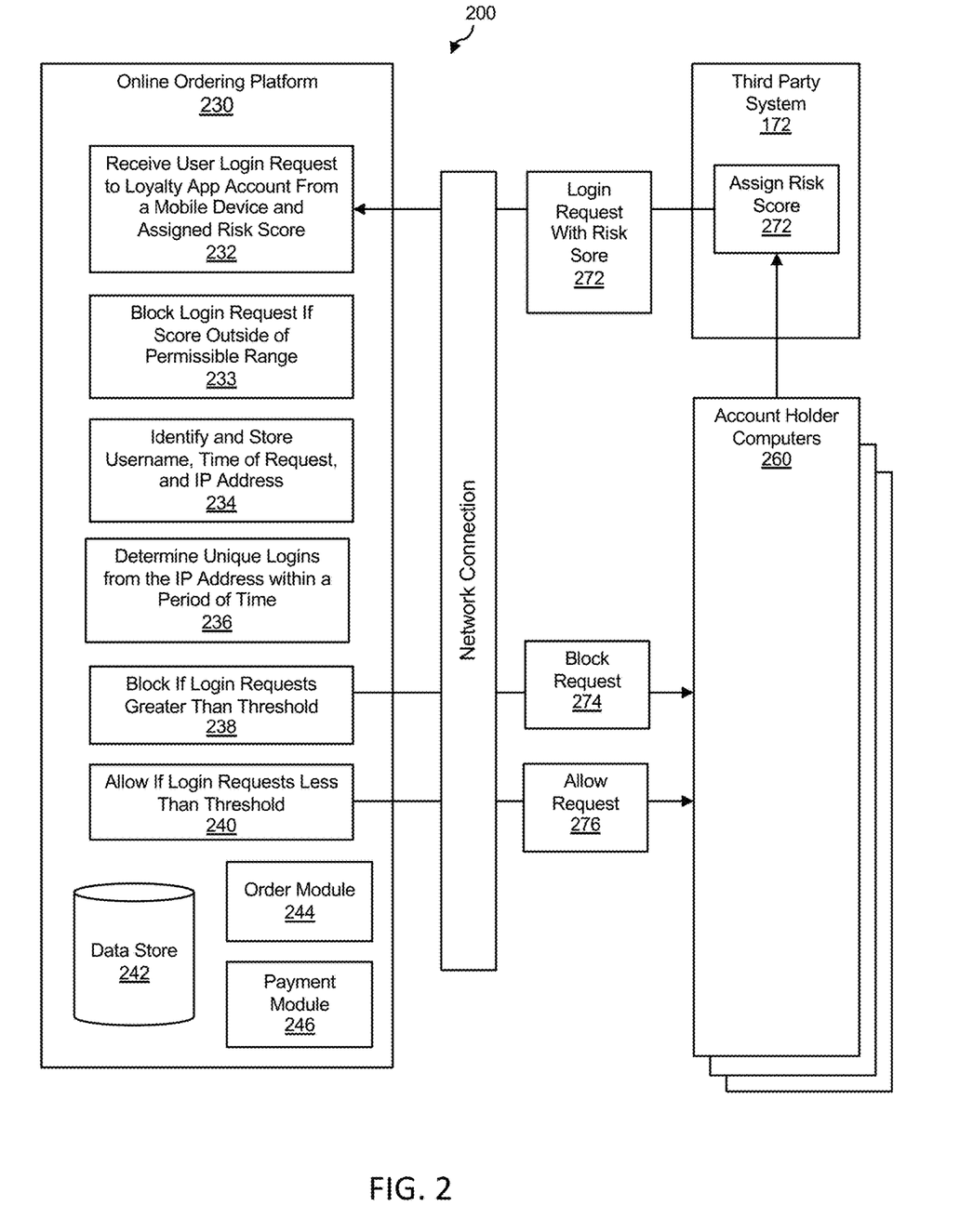
FIG. 2 illustrates another system in accordance with one embodiment of the present invention.

In reference to FIG. 2, a system 200 in accordance with one embodiment of the present invention is shown. The system is similar to the system illustrated in FIG. 1, but also incorporates a scoring metric provided by a third-party. In this embodiment, the account holder computer 260 transmits a login requests to a third-party system 172. The request may be first sent to the platform 230 and then transmitted to the third party system. The third-party system assigns a risk to the request based on a number of available data points available to risk assessment module 272. These may include, but are not limited to the type of device, the geographic location of the device, the known history of the device, the time of the request, etc. One example of such a risk scoring assessment is provided by third party Akami under the brand name account protector. In one embodiment of the present invention a risk score is assigned between 0 and 100. It should be understood, however, that the present invention is not limited in this regard and that different scores and factors may be used.

In reference to the system 200 shown in FIG. 2, the login request with the associated risk score 272 is communicated to the platform via the network. In some embodiments of the present invention, the risk score is assigned using a module executing on the platform. The platform 230 includes a module 222 that blocks the request if the score is outside of a permissible range indicating that the risk is coming from a user to which a high risk is associated. In some embodiments, the risk score that is 80 or above is unacceptable. This embodiment of the system provides two separate mechanisms to identify fraud.

Figure 3:
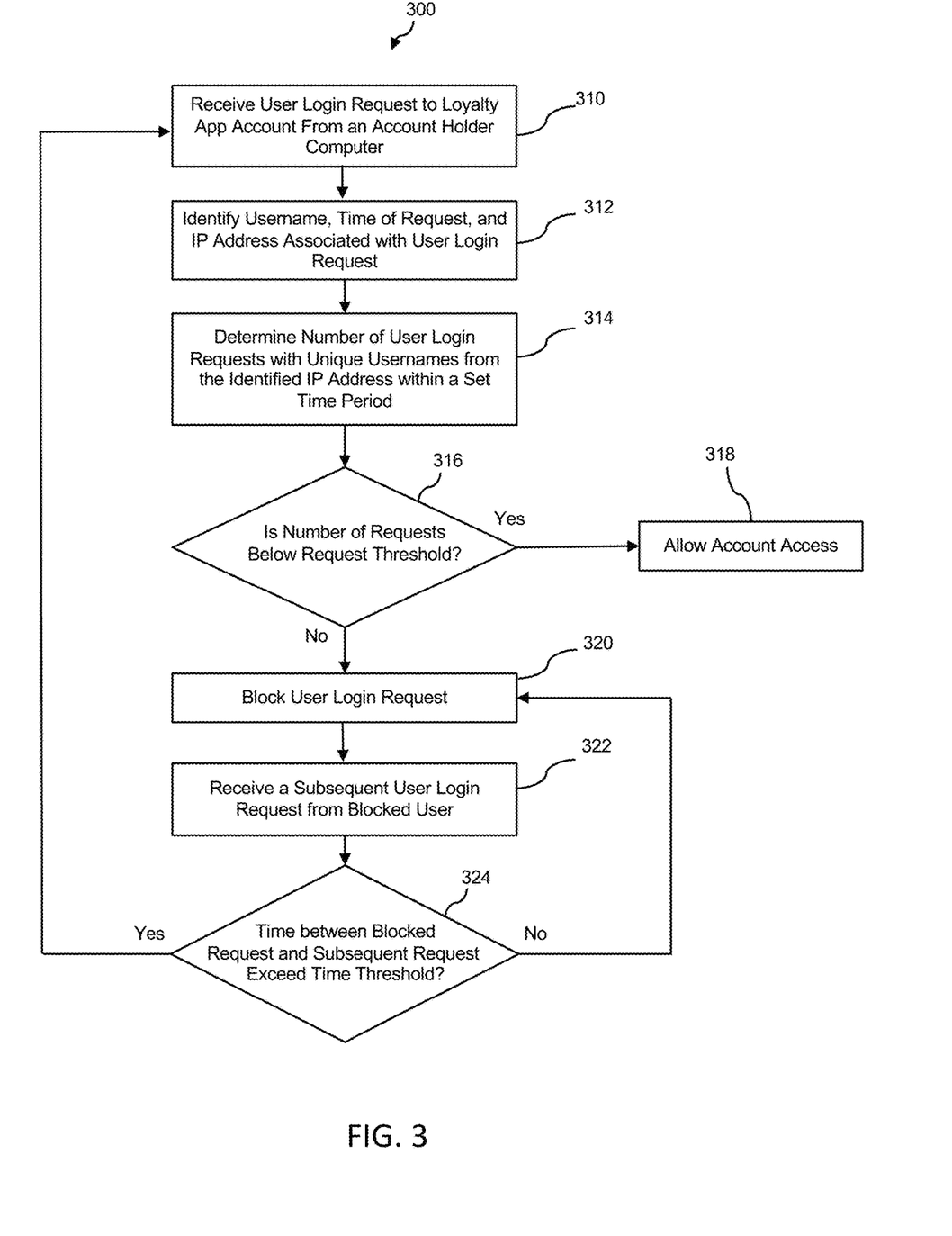
FIG. 3 is a flowchart illustrating a method in accordance with one embodiment of the present invention.

In reference to FIG. 3, a method 300 for deterring unauthorized access to an account associated with an online ordering application operating on a server from an account holder computer is illustrated. The method includes the step 310 of receiving a user login request to a loyalty app account. The request is received from an account holder computer. In the next step of the method 312, a username associated with the login request, a time associated with the login request, and an IP address associated with the login request are identified. The next step 314 involves determining a number of user login request with unique usernames from the identified IP address within a set period of time. In the next step in the method 316, if the number of requests is below a request threshold, then the method performs the step of allowing account access 318 in response to the request. If the number of requests is not below the threshold, the method performs the step of blocking the user login request.

The method 300 includes the optional step of receiving a subsequent user request from a blocked user 322. The method then determines whether the time between the blocked request exceeds a threshold. If the time does not exceed the threshold, the method performs the step of blocking the user login request 320. If the time between the blocked request and the subsequent request exceeds the time threshold, the method returns to the first step 310.

Figure 4:
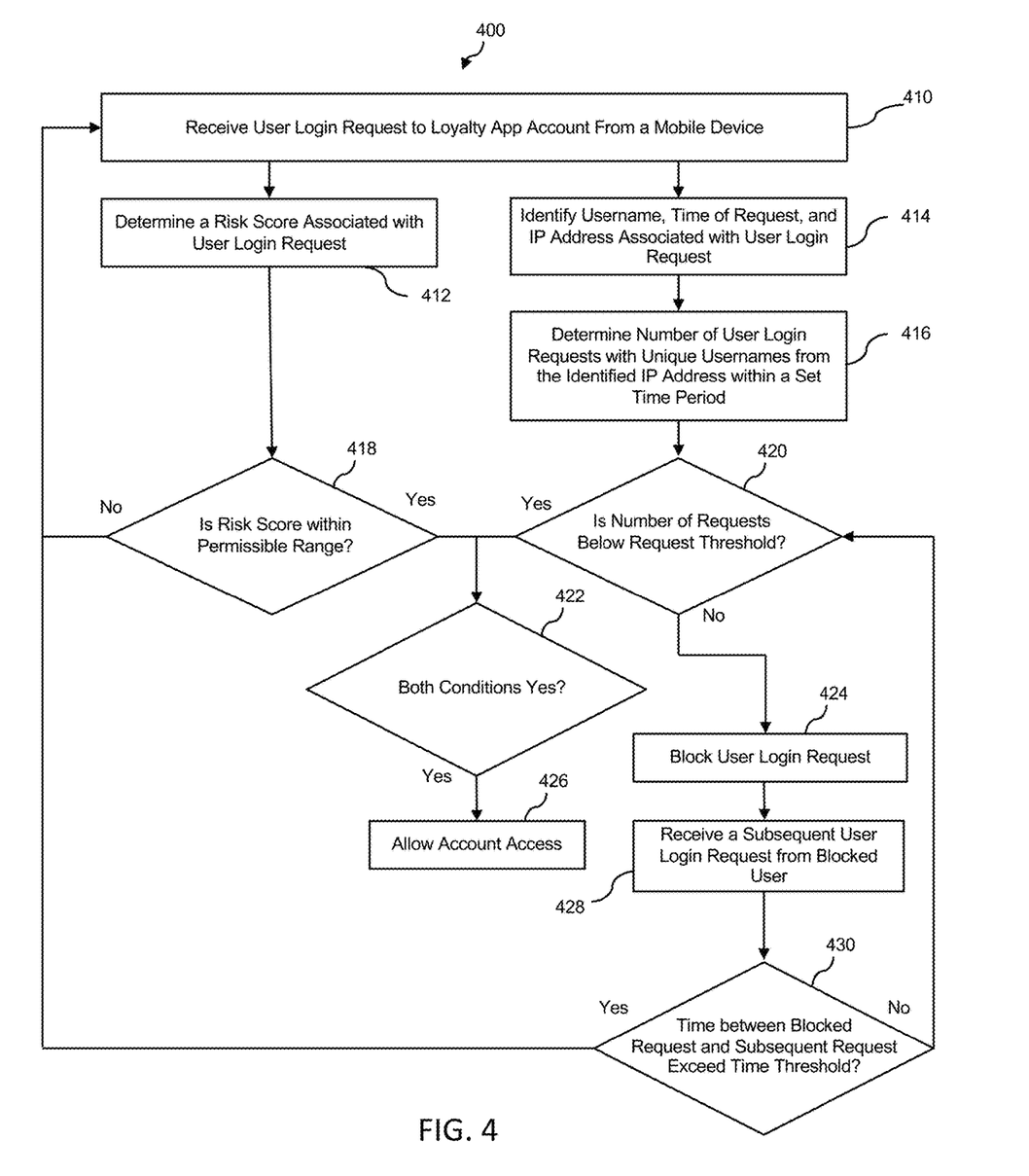
FIG. 4 is another flowchart illustrating a method in accordance with one embodiment of the present invention.

In reference to FIG. 4, another method 400 in accordance with an embodiment of the present invention is shown. In this embodiment, the method independently uses a risk scores and IP address to determine whether to block or allow access to the account. The method first includes the step of receiving a user login request to a loyalty app from a mobile device 410. Next, the method 400 proceeds along two paths. In one path 412, the method determines a risk score associated with the user login request. If the risk score is within a permissible range, a first condition required for account access is satisfied. In a second path 414, the method identifies a username, time of request, and IP address associated with a user login request. Next, the method includes the step 416 of determining a number of login requests with unique usernames from the identified IP address within a set period of time. If the number of requests is below a request threshold 420 the second of two conditions is met. If both conditions are satisfied, the method allows access to the account 426. If only one of the conditions is met, the system will block access to the account.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A system for deterring unauthorized access to an account associated with a restaurant online ordering platform configured to receive payment for food ordered from the restaurant in the form of one or more of gift certificates issued by the restaurant or loyalty points issued by the restaurant, comprising:
   a server hosting an online ordering application that enables authorized users to place an order of food from the restaurant and pay for the order at the restaurant using one or more of gift certificates issued by the restaurant or loyalty points issued by the restaurant through an account holder computer connected to the server via the Internet;
   a data store accessible by the server;
   the data store having an account database, the account database having a plurality of records each having a username associated therewith;
   the online ordering application executing on the server to perform a plurality of actions on the server, the plurality of actions comprising:
   receiving a user login request from one of the plurality of account holder computers;
   identifying a username associated with the received user login request, a time associated with the received user login request, and an internet protocol (IP) address associated with the received user login request;
   determining a number of prior login requests received from the identified IP address during a duration of time being five minutes or less ($T_R$) immediately prior to the identified time, each of the received login requests having a unique username being different than identified username;
   disabling access to the account associated with the identified username for a duration of time $T_B$ being at least fifteen minutes and less than sixty minutes when the determined number of received login requests is above a request threshold B being two or less.

2. The system of claim 1, the plurality of actions further comprising:
   reviewing a received login request to determine whether the account is disabled;
   wherein the system prevents access to the account when the account is disabled.

3. The system of claim 1, wherein the request threshold B is two, $T_B$ is fifteen minutes, and $T_R$ is one minute or less.

4. The system of claim 1, wherein the plurality of actions further comprise identifying a risk score associated with the received login request.

5. The system of claim 4, wherein the plurality of actions further comprise determining whether the risk score associated with the received request is within an acceptable risk score range.

6. The system of claim 5, wherein the plurality of actions further comprise disabling access to the account associated with the identified username when the risk score is not within the acceptable risk score range.

7. A system for deterring unauthorized access to an account associated with a restaurant online ordering platform configured to receive payment for food ordered from the restaurant in the form of one or more of gift certificates issued by the restaurant or loyalty points issued by the restaurant, comprising:
- a server hosting an online ordering application that enables authorized users to place an order of food from the restaurant and pay for the order at the restaurant using one or more of gift certificates issued by the restaurant or loyalty points issued by the restaurant;
- a plurality of account holder computers capable of accessing the server via a connection over the Internet;
- an account database accessible by the server, the account database having a plurality of records each having a username associated therewith;
- the online ordering application executing on the server to perform a plurality of actions on the server, the plurality of actions comprising:
- receiving a user login request from one of the plurality of account holder computers;
- identifying a username associated with the received user login request, a time associated with the received user login request, an internet protocol (IP) address associated with the received user login request, and a risk score associated with the received login request;
- determining a number of previous login requests received from the identified IP address during a duration of time being five minutes or less ($T_R$) immediately before the identified time, each of the received login requests having a unique username being different than identified username, determining whether the risk score associated with the received request is within an acceptable risk score range;
- disabling access to the account associated with the identified username for a duration of time $T_B$ being at least fifteen minutes and less than sixty minutes when one or more of: the determined number of received login requests is above a request threshold B being two or less and the risk score is not within the acceptable risk score range.

8. The system of claim 7, wherein the identified risk score is provided by a third party based on one or more attributes associated with the account holder computer.

9. The system of claim 7, the plurality of actions further comprising:
- reviewing a received login request to determine whether the account is disabled;
- wherein the system prevents access to the account when the account is disabled.

10. The system of claim 9, wherein the request threshold B is two, $T_B$ is fifteen minutes, and $T_R$ is one minute.

11. A method for deterring unauthorized access to an account associated with a restaurant online ordering application operating on a server from an account holder computer configured to receive payment for food ordered from the restaurant in the form of one or more of gift certificates issued by the restaurant or loyalty points issued by the restaurant, the method comprising the steps of:
- on the application server, receiving a user login request from one of a plurality of account holder computers;
- identifying a username associated with the received user login request, a time associated with the received user login request, and an internet protocol (IP) address associated with the received user login request;
- determining a number of prior login requests received from the identified IP address during a duration of time being five minutes or less ($T_R$) prior to the identified time, each of the received login requests having a unique username being different than identified username;
- disabling access to the account associated with the identified username for a duration of time $T_B$ being at least fifteen minutes and less than sixty minutes when the determined number of received login requests is above a request threshold B being two or less.

12. The method of claim 11, further comprising the step of:
- reviewing a received login request to determine whether the account is disabled;
- preventing access to the account when the account is disabled.

13. The method of claim 11, wherein the request threshold B is two, $T_B$ is fifteen minutes, and $T_R$ is one minute.

14. The method of claim 11, further comprising the step of:
- identifying a risk score associated with the received login request.

15. The method of claim 14, further comprising the step of:
- determining whether the risk score associated with the received request is within an acceptable risk score range.

16. The method of claim 15, further comprising the step of:
- disabling access to the account associated with the identified username when the risk score is not within the acceptable risk score range.

17. A system for deterring unauthorized access to an account associated with a restaurant online ordering platform configured to receive payment for food ordered from the restaurant in the form of one or more of gift certificates issued by the restaurant or loyalty points issued by the restaurant, comprising:
- a server hosting an online ordering application that enables authorized users to place an order of food from the restaurant and pay for the order at the restaurant using one or more of gift certificates issued by the restaurant or loyalty points issued by the restaurant through an account holder computer connected to the server via the Internet;
- a data store accessible by the server, the data store having an account database with a plurality of records each having a username associated therewith;
- the online ordering application executing on the server to perform a plurality of actions on the server, the plurality of actions comprising:
- receiving a user login request from one of the plurality of account holder computers;
- identifying a username associated with the received user login request, an internet protocol (IP) address associated with the received user login request, and an account associated with the received login request;
- disabling access to the account for a duration of time being at least fifteen minutes and less than sixty minutes ($T_B$) upon receipt of a request to access the account from the IP address, when the number of login requests from different usernames received from the IP address during a period of five minutes or less ($T_R$) immediately prior to the access request is greater than a request threshold B being two.

18. The system of claim 17, the plurality of actions further comprising:

reviewing a received login request to determine whether the account is disabled;
wherein the system prevents access to the account when the account is disabled.

19. The system of claim 17, wherein $T_B$ is fifteen minutes and $T_R$ is one minute.

* * * * *